(12) United States Patent
Perreault et al.

(10) Patent No.: US 10,855,977 B2
(45) Date of Patent: Dec. 1, 2020

(54) NEAR-EYE DISPLAY WITH EXTENDED ACCOMMODATION RANGE ADJUSTMENT

(71) Applicant: Google LLC, Mountain View, CA (US)

(72) Inventors: John D. Perreault, Mountain View, CA (US); Patrick Llull, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 69 days.

(21) Appl. No.: 15/897,633

(22) Filed: Feb. 15, 2018

(65) Prior Publication Data

US 2018/0343443 A1  Nov. 29, 2018

Related U.S. Application Data

(60) Provisional application No. 62/511,567, filed on May 26, 2017.

(51) Int. Cl.

| | |
|---|---|
| *H04N 13/04* | (2006.01) |
| *H04N 9/47* | (2006.01) |
| *H04N 13/383* | (2018.01) |
| *G02B 27/00* | (2006.01) |
| *G02B 27/01* | (2006.01) |

(Continued)

(52) U.S. Cl.
CPC ....... *H04N 13/383* (2018.05); *G02B 27/0075* (2013.01); *G02B 27/0093* (2013.01); *G02B 27/0172* (2013.01); *G02B 30/26* (2020.01); *G02B 30/27* (2020.01); *G02F 1/29* (2013.01); *H04N 13/128* (2018.05); *H04N 13/305* (2018.05); *H04N 13/344* (2018.05);
(Continued)

(58) Field of Classification Search
CPC .......................... H04N 13/344; H04N 13/383
See application file for complete search history.

(56) References Cited

U.S. PATENT DOCUMENTS

| | | |
|---|---|---|
| 8,248,458 B2 | 8/2012 | Schowengerdt et al. |
| 9,406,166 B2 | 8/2016 | Futterer |

(Continued)

FOREIGN PATENT DOCUMENTS

WO        2015134740 A1     9/2015

OTHER PUBLICATIONS

English Translation of Taiwanese Office Action dated Jun. 27, 2019 for corresponding TW Application No. 107107311, 8 pages.

(Continued)

*Primary Examiner* — Fabio S Lima

(57) ABSTRACT

A near-eye display system includes a display panel to display a near-eye lightfield frame comprising an array of elemental images and an eye tracking component to track a pose of a user's eye. The system further includes a lenslet array and a rendering component to adjust the focal points of the array of elemental images in the integral lightfield frame based on the pose of the user's eye. A method of operation of the near-eye display system includes determining, using an eye tracking component of the near-eye display system, a first pose of a user's eye and determining a desired focal point for an array of elemental images forming an integral lightfield frame based on the first pose of the user's eye. The method further includes changing the focal length of light projecting out of a lenslet array based on the first pose of the user's eye.

6 Claims, 6 Drawing Sheets

(51) Int. Cl.
    *G02B 30/26*     (2020.01)
    *G02B 30/27*     (2020.01)
    *H04N 13/128*     (2018.01)
    *H04N 13/305*     (2018.01)
    *H04N 13/344*     (2018.01)
    *G02F 1/29*     (2006.01)

(52) U.S. Cl.
    CPC ............... *G02B 2027/0138* (2013.01); *G02B 2027/0178* (2013.01)

(56) References Cited

U.S. PATENT DOCUMENTS

| | | | |
|---|---|---|---|
| 9,519,144 B2 | 12/2016 | Lanman et al. | |
| 9,841,537 B2 | 12/2017 | Luebke et al. | |
| 2004/0212550 A1* | 10/2004 | He | H04N 13/322 345/6 |
| 2013/0088413 A1* | 4/2013 | Raffle | G09G 3/003 345/7 |
| 2014/0292620 A1* | 10/2014 | Lapstun | G02B 26/0833 345/6 |
| 2015/0262424 A1 | 9/2015 | Tabaka et al. | |
| 2016/0041449 A1 | 2/2016 | Clark et al. | |
| 2016/0106533 A1 | 4/2016 | Galstian et al. | |
| 2016/0295202 A1 | 10/2016 | Evans et al. | |
| 2017/0061838 A1 | 3/2017 | Shi et al. | |
| 2017/0195659 A1* | 7/2017 | Du | H04N 13/307 |
| 2017/0269367 A1* | 9/2017 | Qin | G02B 27/01 |
| 2018/0131926 A1* | 5/2018 | Shanks | H04N 13/383 |

OTHER PUBLICATIONS

Written Opinion of the International Preliminary Examining Authority dated May 3, 2019 for International Application No. PCT/US2018/018432, 8 pages.
Taiwanese Office Action dated Jan. 24, 2019 for corresponding TW Application No. 107107311 with English translation; 17 pages.
International Search Report and Written Opinion dated May 7, 2018 for PCT Application No. PCT/US2018/018432, 16 pages.
Javidi Bharam, et al., "Multidimensional Optical Sensing and Imaging System (MOSIS): From Macroscales to Microscales", Proceedings of the IEEE, IEEE, New York, US, vol. 105, No. 5, May 1, 2018, XP011646476, ISSN: 0018-9219, DOIL 10.1109/JPROC.2017.2654318), 26 pages.
English Translation of Taiwanese Office Action dated Mar. 26, 2020 for corresponding TW Application No. 107107311, 9 pages.
Castro et al., "Integral imaging with large depth of field using an asymmetric phase mask", Optics Express, vol. 15, No. 16, p. 10266-1027373, Sep. 2007; 8 pages.

\* cited by examiner

NEAR-EYE DISPLAY WITH EXTENDED ACCOMMODATION RANGE ADJUSTMENT

CROSS REFERENCE TO RELATED APPLICATIONS

This application is related to U.S. Provisional Patent Application 62/511,567, entitled "NEAR-EYE DISPLAY WITH EXTENDED ACCOMMODATION RANGE ADJUSTMENT" and filed on May 26, 2017, the entirety of which is incorporated by reference herein.

BACKGROUND

Head-mounted displays (HMDs) and other near-eye display systems can utilize an integral lightfield display or other computational display to provide effective display of three-dimensional (3D) graphics. Generally, the integral lightfield display employs one or more display panels and an array of lenslets, pinholes, or other optic features that overlie the one or more display panels. A rendering system renders an array of elemental images, with each elemental image representing an image or view of an object or scene from a corresponding perspective or virtual camera position. Such integral lightfield displays typically exhibit a tradeoff between resolution and accommodation range as resolution is proportional to the density of lenslets. Thus, to provide satisfactory resolution, a conventional near-eye display system employing an integral lightfield display typically has a low density of large-sized lenslets, which limits the display resolution or has a high density of smaller-sized lenslets that limit the accommodation range.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate example methods and systems for dynamic focal length and accommodation range adjustment based on user eye pose in a near-eye display system. In at least one embodiment, the near-eye display system employs a computational display to display integral lightfield frames of imagery to a user so as to provide the user with an immersive virtual reality (VR) or augmented reality (AR) experience. Each integral lightfield frame is composed of an array of elemental images, with each elemental image representing a view of an object or scene from a different corresponding viewpoint. An array of lenslets overlies the display panel and operates to present the array of elemental images to the user as a single autostereoscopic image.

As the resolution of computational display are proportional to the ratio of lenslet size to lenslet focal length, an attempt to increase resolution using large lenslets generally results in reduced focal lengths and accommodation ranges, and vice versa. To provide improved resolution without a corresponding reduction in accommodation range, in at least one embodiment the near-eye display systems described herein utilize a dynamic technique wherein an eye tracking component is utilized to determine the current pose (position and/or rotation) of the user's eye and, based on this current pose, determine a voltage to be applied to a variable-index material by which light projected out of lenslets have their focal lengths changed so as to change how in focus portions of an image are perceived based on the current pose of the user's eye. As an example, the refractive index of the material may initially be set to generate a first accommodation range within which objects may be perceived in focus. Subsequently, the refractive index of the material may be changed to generate a second accommodation range within which objects may be perceived in focus. As the user's gaze changes, the refractive index of the material is changed to dynamically adjust the accommodation range within which objects may be perceived in focus. Thus, dynamically changing the refractive index and shifting the accommodation range responsive to changes in the pose of the eye in the user effectively provides for a large accommodation range without requiring a corresponding reduction in the resolution of the near-eye display system.

Figure 1:
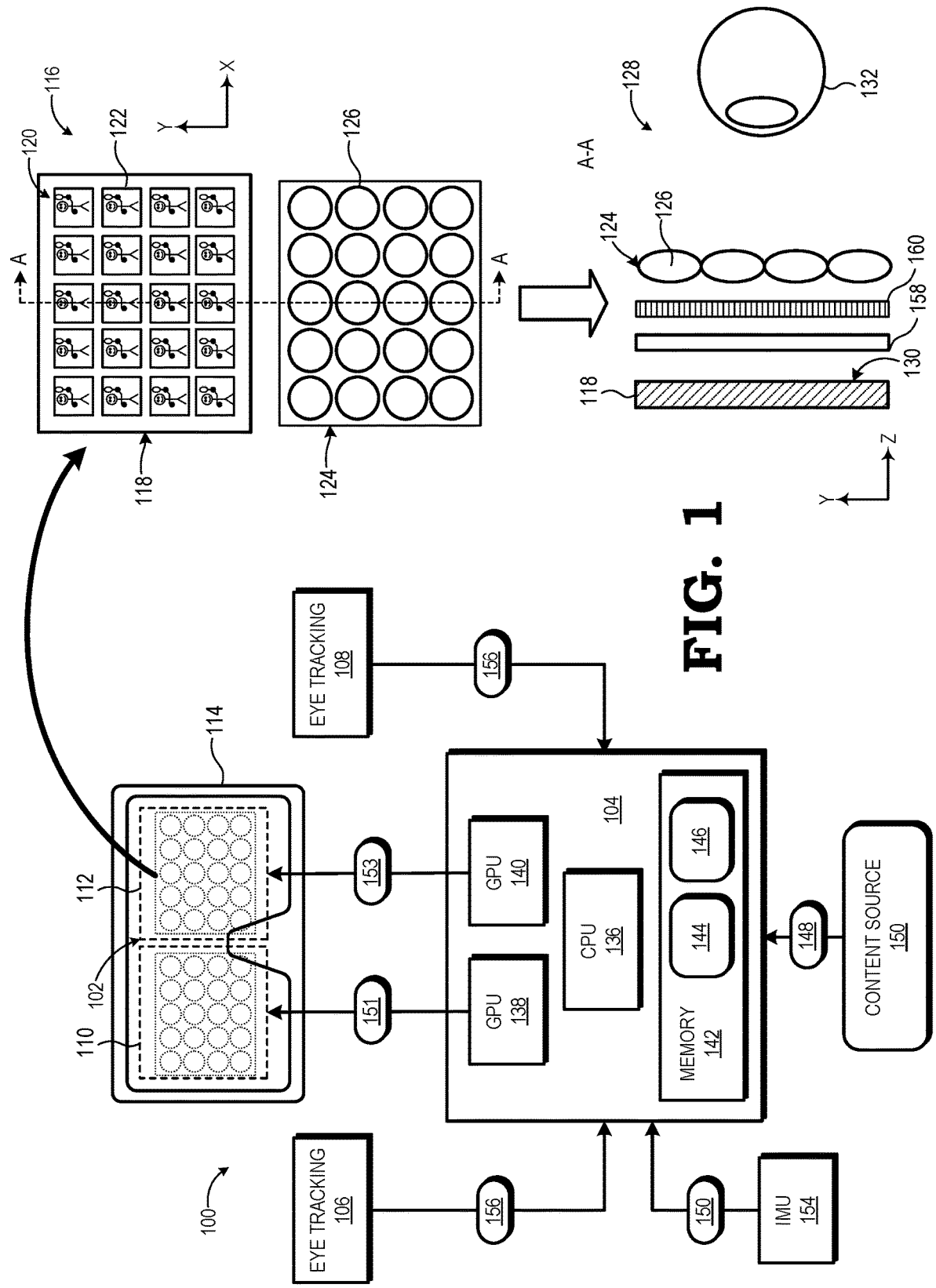
FIG. 1 is a diagram illustrating a near-eye display system employing eye tracking and corresponding elemental image shifting to provide dynamic focal length adjustment in accordance with some embodiments.

FIG. 1 illustrates a near-eye display system 100 incorporating dynamic accommodation range adjustment in accordance with at least one embodiment. In the depicted example, the near-eye display system 100 includes a computational display sub-system 102, a rendering component 104, and one or more eye tracking components, such as one or both of an eye tracking component 106 for tracking a user's left eye and an eye tracking component 108 for tracking the user's right eye. The computational display sub-system 102 includes a left-eye display 110 and a right-eye display 112 mounted in an apparatus 114 (e.g., goggles, glasses, etc.) that places the displays 110, 112 in front of the left and right eyes, respectively, of the user.

As shown by view 116, each of the displays 110, 112 includes at least one display panel 118 to display a sequence or succession of integral lightfield frames (hereinafter, "lightfield frame" for ease of reference), each of which comprises an array 120 of elemental images 122. For ease of reference, an array 120 of elemental images 122 may also be referred to herein as a lightfield frame 120. Each of the displays 110, 112 further includes an array 124 of lenslets 126 (also commonly referred to as "microlenses") overlying the display panel 118. Typically, the number of lenslets 126 in the lenslet array 124 is equal to the number of elemental images 122 in the array 120, but in other implementations the number of lenslets 126 may be fewer or greater than the number of elemental images 122. Note that while the example of FIG. 1 illustrates a 5×4 array of elemental images 122 and a corresponding 5×4 array 120 of lenslets 126 for ease of illustration, in a typical implementation the number of elemental images 122 in a lightfield frame 120 and the number of lenslets 126 in the lenslet array 124 typically is much higher. Further, in some embodiments, a separate display panel 118 is implemented for each of the displays 110, 112, whereas in other embodiments the left-eye display 110 and the right-eye display 112 share a single display panel 118, with the left half of the display panel 118 used for the left-eye display 110 and the right half of the display panel 118 used for the right-eye display 112.

Cross-view 128 of FIG. 1 depicts a cross-section view along line A-A of the lenslet array 124 overlying the display panel 118 such that the lenslet array 124 overlies the display surface 130 of the display panel 118 so as to be disposed between the display surface 130 and the corresponding eye 132 of the user. In this configuration, each lenslet 126 focuses a corresponding region of the display surface 130 onto the pupil 134 of the eye, with each such region at least partially overlapping with one or more adjacent regions. Thus, in such computational display configurations, when an array 120 of elemental images 122 is displayed at the display surface 130 of the display panel 118 and then viewed by the eye 132 through the lenslet array 124, the user perceives the array 120 of elemental images 122 as a single image of a scene. Thus, when this process is performed in parallel for both the left eye and right eye of the user with the proper parallax implemented therebetween, the result is the presentation of autostereoscopic three-dimensional (3D) imagery to the user.

As also shown in FIG. 1, the rendering component 104 includes a set of one or more processors, such as the illustrated central processing unit (CPU) 136 and graphics processing units (GPUs) 138, 140 and one or more storage components, such as system memory 142, to store software programs or other executable instructions that are accessed and executed by the processors 136, 138, 140 so as to manipulate the one or more of the processors 136, 138, 140 to perform various tasks as described herein. Such software programs include, for example, rendering program 144 comprising executable instructions for an accommodation range adjustment process, as described below, as well as an eye tracking program 146 comprising executable instructions for an eye tracking process, as also described below.

In operation, the rendering component 104 receives rendering information 148 from a local or remote content source 150, where the rendering information 148 represents graphics data, video data, or other data representative of an object or scene that is the subject of imagery to be rendered and displayed at the display sub-system 102. Executing the rendering program 144, the CPU 136 uses the rendering information 148 to send drawing instructions to the GPUs 138, 140, which in turn utilize the drawing instructions to render, in parallel, a series of lightfield frames 151 for display at the left-eye display 110 and a series of lightfield frames 153 for display at the right-eye display 112 using any of a variety of well-known VR/AR computational/lightfield rendering processes. As part of this rendering process, the CPU 136 may receive pose information 150 from an inertial management unit (IMU) 154, whereby the pose information 150 is representative of a current pose of the display sub-system 102 and control the rendering of one or more pairs of lightfield frames 151, 153 to reflect the viewpoint of the object or scene from the current pose.

As described in detail below, the rendering component 104 further may use eye pose information from one or both of the eye tracking components 106, 108 to shift the focal length of projections of elemental images 122 from the lenslet array 124 to the eye 132 for the lightfield frame to be displayed, and thereby adjusting the focus of one or more of the elemental images 122 for the lightfield frame so displayed. To this end, the eye tracking components 106, 108 each may include one or more infrared (IR) light sources (referred to herein as "IR illuminators) to illuminate the corresponding eye with IR light, one or more imaging cameras to capture the IR light reflected off of the corresponding eye as a corresponding eye image (eye image information 156), one or more mirrors, waveguides, beam splitters, and the like, to direct the reflected IR light to the imaging cameras, and one or more processors to execute the eye tracking program 146 so as to determine a current position, current orientation, or both (singularly or collectively referred to herein as "pose") of the corresponding eye from the captured eye image. Any of a variety of well-known eye tracking apparatuses and techniques may be employed as the eye tracking components 146, 148 to track one or both eyes of the user.

In a conventional computational display-based system, the properties of the lenslet array overlaying a display are typically fixed (that is, the physical dimensions and/or the material construction of the lenslets are fixed, and often are the same for all the lenslets), which in turn results in the optical properties of the lenslets being fixed. As a result, changing the focus at which the user perceives the displayed imagery often includes mechanical actuation to physically move the lenslet array closer to or further away from the user's eyes. In near-eye display systems, the small focal length of lenslets subjects them to small lens-display spacing tolerances. As a result, any inaccuracies in the initial construction of the lenslet array or inaccuracies in mechanical translation during operation can result in unintended impacts to the user's perception of the displayed imagery, such as loss of focus or blurry objects in displayed imagery.

As described herein, in at least one embodiment the near-eye display system 100 improves the accuracy of adjustments to the focus of displayed imagery by implementing a variable-focal-length lenslet array configured to adjust the focal length of projected imagery to more closely align with the current pose of the user's eye. This is accomplished by using the eye tracking components 106, 108 to track one or both eyes of the user so as to determine the current pose of one or both of the eyes for a corresponding lightfield frame to be displayed. With the current pose determined, the rendering component 104 then electrically adjusts the focal length of light projected from one or more of the lenslets 126 in the lenslet array to change the focus point of one or more of the elemental images 122 within a lightfield frame being rendered relative to the user's eye 132. This change to the focus point brings objects as displayed by the display panel 118 into- or out-of-focus from the user's perspective. In this manner, the focal length(s) of the lenslets 126 may be dynamically adjusted to better accommodate the current pose of the user's eye.

In some embodiments, the lenslet array 124 includes lenslets constructed from nematic liquid crystal cells. The nematic liquid crystal cells are electrically addressable using, for example, a voltage source (not shown). Changes in an applied voltage to the lenslets 126 cause the refractive index of the lenslet to change, thereby changing the focal length of the lenslets. In other embodiments, rather than using lenslets constructed from nematic liquid crystal cells, a layer of variable-index material 158 (such as constructed out of nematic liquid crystal cells or other variable-focus optical components configured to have variable focal lengths) is positioned so as to be disposed between the display panel 118 and the lenslet array 124.

Although described here in the context of nematic liquid crystals, those skilled in the art will recognize that any variable-index material and/or variable-focus optical component may be used without departing from the scope of this disclosure. For example, such optical components can include, but is not limited to, deformable membrane mirrors (DMMs), fluid lenses, spatial light modulators (SLMs), electro-optical polymers, etc. Additionally, in some other embodiments, focal length of light projected from the lenslet array 124 may further be adjusted by combining the variable-index lenslets or layer of variable-index material with a mechanical actuator (not shown) to change the physical distance between the lenslet array 124, the layer of variable-index material 158, the display panel 118, and the eye 132. For example, such mechanical actuators may include piezoelectric, voice-coil, or electro active polymer actuators.

In one embodiment, a voltage is applied to the lenslet array 124 or the layer of variable-index material 158 as a whole. Accordingly, each individual lenslet 126 or the entire layer of variable-index material 158 receives the same voltage for adjusting its refractive index, thereby changing the focal length of light projected from the entire lenslet array 124. This achieves the same effect as mechanically actuating and translating the lenslet array 124 closer to or further away from the eye 132, and further improves the accuracy of achieving the desired focal length. In another embodiment, each of the lenslets 126 are individually addressable and can receive a different voltage from one another. Similarly, the layer of variable-index material 158 may be pixelated with dimensions matching that of the lenslet array; each of the pixelated areas of the layer of variable-index material 158 may be individually addressable. This allows greater control over the focal length of light projected from each lenslet 126. Accordingly, the focal length of light projected from each lenslet 126 is modulable and each of the elemental images 122 may represent different portions of an image with a different viewing distance to objects in the image. To provide further granularity in control over focal points, in some embodiments, the layer of variable-index material 158 may be pixelated at a sub-lenslet level with dimensions such that different portions of each elemental image 122 corresponding to each lenslet 126 may be individually addressed to a unique focal length.

Alternatively, to provide further granularity in control over focal points, in other embodiments, the near-eye display system 100 includes an optional phase mask 160 positioned so as to be disposed between the display panel 118 and the lenslet array 124. For example, as illustrated in FIG. 1, the optional phase mask 160 is a pixelated spatial light modulator (SLM) that receives incoming light from the display 118 (or in some embodiments, from variable-index material 158) and spatially modulates the phase of the output light beam. Accordingly, each lenslet 126 would receive an incident beam having a plurality of spatially varying phases for different rays such that different portions of each elemental image 122 may be focused to at different focal lengths.

In other embodiments, the lenslet array 124 or the layer of variable-index material 158 may be segmented into two or more partitions. Each partition may be addressed with the same voltage, thereby changing the focal length for that portion only. For example, the lenslet array 124 or the layer of variable-index material 158 may be segmented into four equal quadrants that each receive a different voltage signal, into individually addressable rows, into individually columns, etc. Those skilled in the art will recognize that any segmentation of the lenslet array 124 or the layer of variable-index material 158 into spatially-varying addressable partitions may be used without departing from the scope of this disclosure.

Figure 2:
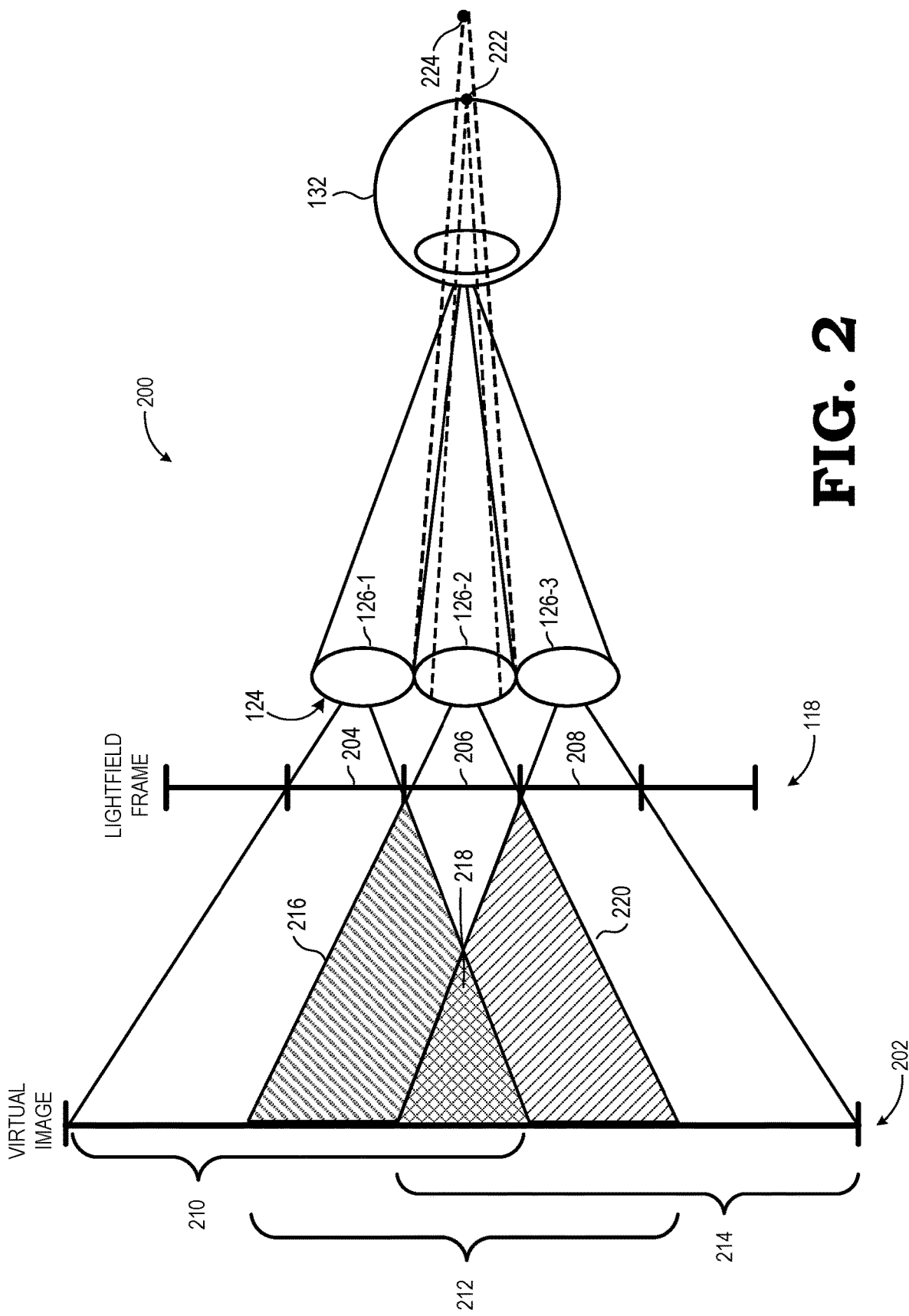
FIG. 2 is a diagram illustrating an example of dynamic focal length adjustment in the near-eye display system of FIG. 1 in accordance with some embodiments.

To illustrate, FIG. 2 depicts a cross-section view 200 of a computational display such as the ones utilized in the near-eye display system 100 using variable-index lenslets. As shown in this view, each of the lenslets 126 of the lenslet array 124 serves as a separate "projector" onto the eye 132, with each "projector" overlapping with one or more adjacent projectors in forming a composite virtual image 202 from the array of elemental images displayed at the display panel 118. To illustrate, the lenslet 126-1 projects a corresponding elemental image (represented by region 204) from region 210 of the virtual image 202, the lenslet 126-2 projects a corresponding elemental image (represented by region 206) from region 212 of the virtual image 202, and the lenslet 126-3 projects a corresponding elemental image (represented by region 208) from region 214 of the virtual image 202. As shown by FIG. 2, regions 210 and 212 overlap in sub-region 216, regions 212 and 214 overlap in sub-region 220, and all three regions 210, 212, 214 overlap in sub-region 218.

Thus, assuming in this example that an elemental image positioned at region 206 of the display panel 118 is focused on by the eye 132 at a first time $t_1$, the refractive index of lenslet 126-2 may be computed (e.g., by rendering component 104) and electrically changed such that light containing image data from lenslet 126-2 is focused at a first focal point 222 at the back of the eye 132. Accordingly, the region 212 portion of virtual image 202 would appear to be in focus at the first time $t_1$. Subsequently, assuming in this example that the user looks away at a second time $t_2$ to focus on an elemental image positioned at region 204 of the display panel 118. To account for the change to a new pose for the user's eye, the refractive index of lenslet 126-2 may be computed (e.g., by rendering component 104) and electrically changed such that light containing image data from lenslet 126-2 is focused at a second focal point 224 such that the accommodation range of the user's eyes cannot bring such that portion of the image into focus. Accordingly, the region 212 portion of virtual image 202 would appear to be out of focus (e.g., blurry) at the second time $t_2$.

Figure 3:
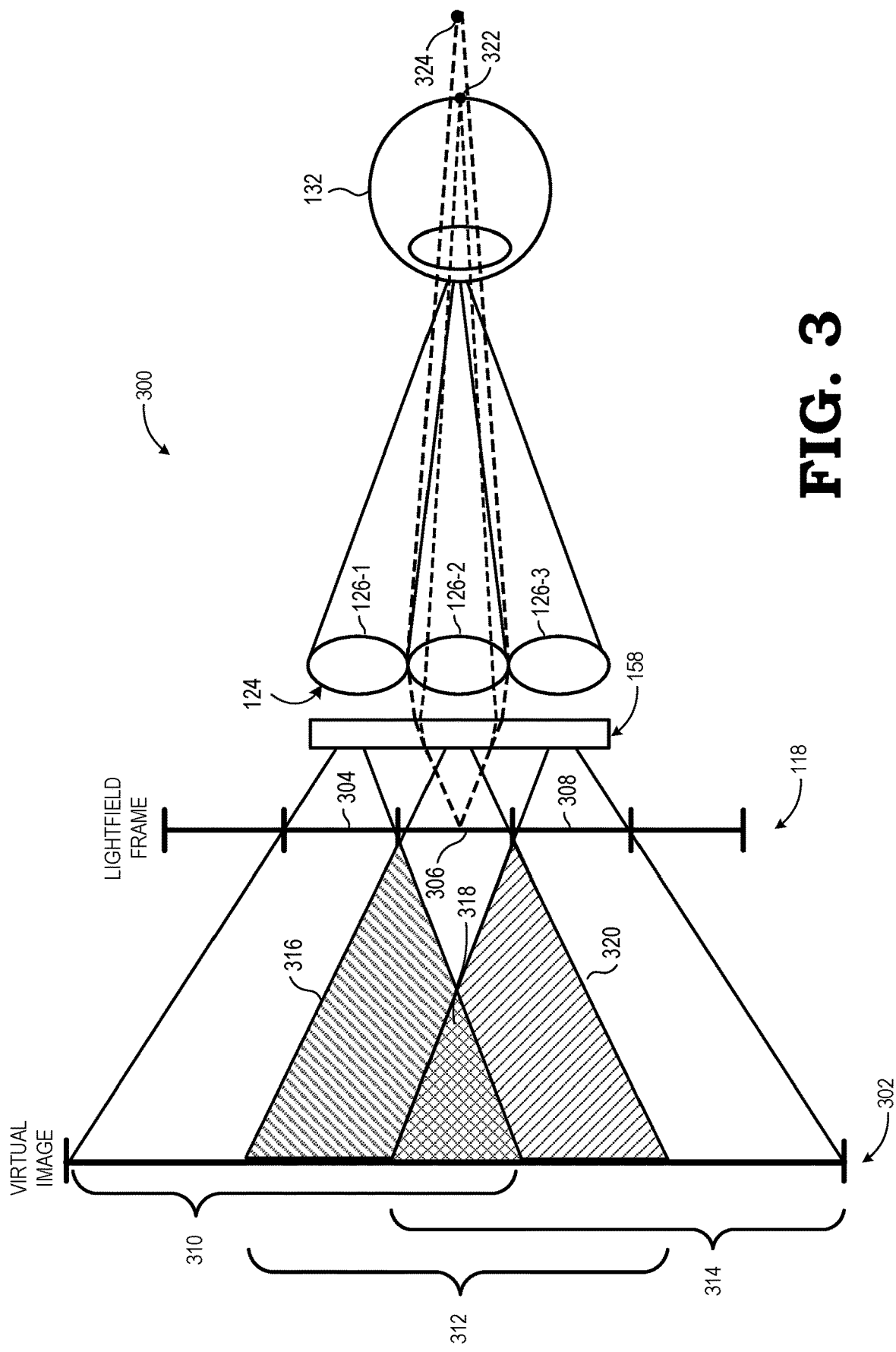
FIG. 3 is a diagram illustrating an additional example of dynamic focal length adjustment in the near-eye display system of FIG. 1 in accordance with some embodiments.

In an alternative embodiment, FIG. 3 depicts a cross-section view 300 of a computational display such as the ones utilized in the near-eye display system 100 using a layer of variable-index material. As shown in this view, each of the lenslets 126 of the lenslet array 124 serves as a separate "projector" onto the eye 132, with each "projector" overlapping with one or more adjacent projectors in forming a composite virtual image 202 from the array of elemental images displayed at the display panel 118. To illustrate, the lenslet 126-1 projects a corresponding elemental image (represented by region 304) from region 310 of the virtual image 302, the lenslet 126-2 projects a corresponding elemental image (represented by region 306) from region 312 of the virtual image 302, and the lenslet 126-3 projects a corresponding elemental image (represented by region 308) from region 314 of the virtual image 302. As shown by FIG. 3, regions 310 and 312 overlap in sub-region 316, regions 312 and 314 overlap in sub-region 320, and all three regions 310, 312, 314 overlap in sub-region 318. In the embodiment illustrated in FIG. 3, the layer of variable-index material 158 (such as previously discussed with respect to FIG. 1) changes its refractive index to change the incidence of light on the lenslets 126, which in turn changes the focal distance of light projected from the lenslets 126.

Thus, assuming in this example that an elemental image positioned at region 306 of the display panel 118 is focused on by the eye 132 at a first time $t_1$, the refractive index of the layer of variable-index material 158 may be computed (e.g., by rendering component 104) and electrically changed such that light containing image data projected from lenslet 126-2 is focused at a first focal point 322 at the back of the eye 132. Accordingly, the region 312 portion of virtual image 302 would appear to be in focus at the first time $t_1$. Subsequently, assuming in this example that the user looks away at a second time $t_2$ to focus on an elemental image positioned at region 304 of the display panel 118. To account for the change to a new pose for the user's eye, the refractive index of the layer of variable-index material 158 may be computed (e.g., by rendering component 104) and electrically changed such that light containing image data from lenslet 126-2 is focused at a second focal point 324 such that the accommodation range of the user's eyes cannot bring such that portion of the image into focus. Accordingly, the region 312 portion of virtual image 302 would appear to be out of focus (e.g., blurry) at the second time $t_2$.

Figure 4:
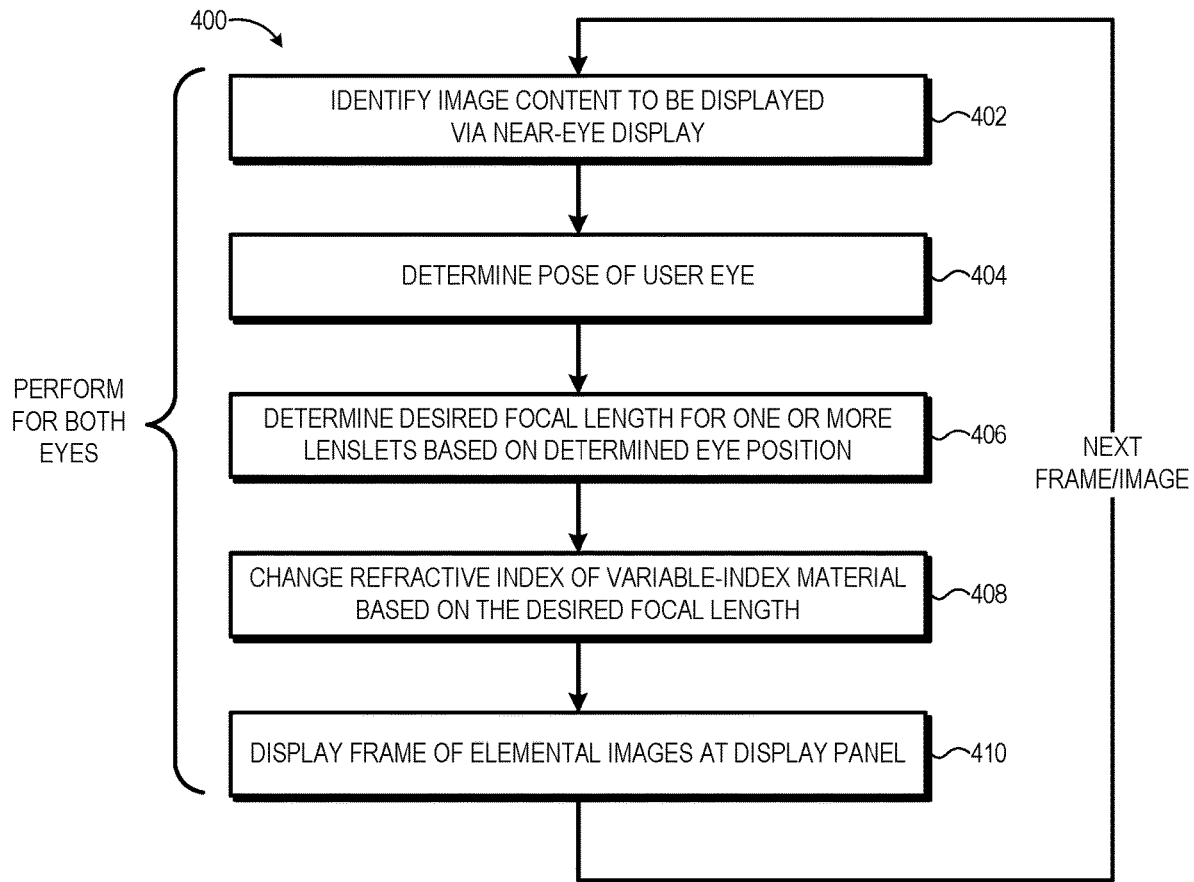
FIG. 4 is a flow diagram illustrating a method for dynamic focal length adjustment in the near-eye display system of FIG. 1 in accordance with some embodiments.

FIG. 4 illustrates a method 400 of operation of the near-eye display system 100 for rendering lightfield frames using lenslets with adjustable focal lengths to provide dynamic image focus adjustments in accordance with some embodiments. The method 400 illustrates one iteration of the process for rendering and displaying a lightfield frame for one of the left-eye display 110 or right-eye display 112, and thus the illustrated process is repeatedly performed in parallel for each of the displays 110, 112 to generate and display a different stream or sequence of lightfield frames for each eye at different points in time, and thus provide a 3D, autostereoscopic VR or AR experience to the user.

For a lightfield frame to be generated and displayed, method 400 starts at block 402, whereby the rendering component 402 identifies the image content to be displayed to the corresponding eye of the user as a lightfield frame. In at least one embodiment, the rendering component 104 receives the IMU information 152 representing data from various pose-related sensors, such as a gyroscope, accelerometer, magnetometer, Global Positioning System (GPS) sensor, and the like, and from the IMU information 150 determines a current pose of the apparatus 114 (e.g., HMD) used to mount the displays 110, 112 near the user's eyes. From this current pose, the CPU 136, executing the rendering program 144, can determine a corresponding current viewpoint of the subject scene or object, and from this viewpoint and graphical and spatial descriptions of the scene or object provided as rendering information 148, determine the imagery to be rendered for the current pose.

At block 404, the CPU 136, executing eye tracking program 146, determines the current pose of the corresponding eye of the user. As explained herein, the current pose of an eye may be determined using any of a variety of eye tracking techniques. Generally, such techniques include the capture of one or more images of IR light reflected from the pupil and cornea of the eye. The eye tracking program 146 then may manipulate the CPU 136 or the GPUs 138, 140 to analyze the images to determine the pose of the eye based on the corresponding position of one or both of the pupil reflection or corneal reflection. Further, the orientation of the pupil relative to the cornea in turn may be used to determine the orientation of the eye (that is, the direction of gaze of the eye). It should be noted that although block 404 is illustrated in FIG. 4 as being subsequent to block 404, the process of block 404 may be performed before, during, or after the process of block 402.

With the current pose of the user's eye determined, at block 406 the rendering program 144 manipulates the CPU 136 to calculate a desired focal length (e.g., to desired a focal point or a focal plane) for one or more lenslets 126 in lenslet array 124, based on the current pose of the user's eye. As explained above, the focal length represents the distance at which the sharpest focus is attained when viewing light (carrying image data) projected from the lenslet. In particular, the desired focal length is intended to allow for image elements (e.g., objects, individuals, scenes and the like in the virtual image) that the user's eye gaze is directed at to be perceived as being in focus after projecting through the lenslet 126. That is, the desired focal length serves to dynamically adjust the distance at which light rays projected from the lenslets converge to match the current pose of the eye, thereby changing the focus at which different views of the image content are perceived.

In at least one embodiment, the calculation of the desired focal length is based at least in part on an identification of a virtual object in the virtual image that the user is directing his or her gaze towards using the current pose of the user's eye relative to the display panel 118. To illustrate, referring to an example scenario illustrated by cross-section view 500 of FIG. 5, the virtual image can include a number of objects intended to be perceived by the eye 132 at different depths. For example, the virtual image includes image data representing a coconut 502 and a tree 504 positioned at depths $d_1$ and $d_2$ within the virtual image, respectively. Assuming in this example that the current pose of the eye as determined in block 404 determines that the user's gaze is focusing on the coconut 502, the desired focal length may be calculated such that light containing image data for the coconut 502 projected from lenslet 126-3 is focused at a first focal point 508 at the back of the eye 132. Accordingly, the coconut 502 in the virtual image would appear to be in focus.

In some embodiments, the calculation of the desired focal length further includes the determination of an accommodation range, which generally refers to a range of depths at which objects in the virtual image will be perceived as in focus. Objects positioned within the accommodation range may be perceived to be in focus; objects positioned outside the accommodation range (i.e., at a virtual depth too close or too far away from the eye) will not be perceived to be in focus even if the current pose of the eye is gazing directly at that out of accommodation range object. For example, referring again to FIG. 5, the tree 504 would not be perceived as in focus even if the current pose of the eye is gazing directly at the tree 504 as it is positioned outside the accommodation range 506.

In contrast, if the accommodation range 512 had been determined, both the coconut 502 and tree 504 could appear to be in focus to the eye 132. In particular, assuming in this example that the current pose of the eye as determined in block 404 determines that the user's gaze is focusing on the coconut 502 at a first time $t_1$, the coconut 502 in the virtual image would appear to be in focus as it is positioned within the accommodation range 512. In some embodiments, at the first time $t_1$, the tree 504 in the virtual image is positioned within the accommodation range 512 but is not perceived to be in focus as the current pose of the eye is focused on the coconut 502. That is, the determination of the accommodation range further includes determining one or more desired focal lengths such that objects positioned within the accommodation range, but are not focused on by the user's gaze, are not perceived to be completely in focus.

The focal lengths can be determined to provide one or more of focus areas in which directed gaze perceives objects in focus and defocus areas in which defocus blur is provided, thereby providing accommodation cues in the form of retinal blur to aid in the simulation of depth perception. However, at a subsequent time $t_2$, if the user's gaze is changed to focus on the tree 504, the tree 504 in the virtual image would appear to be in focus as it is positioned within the accommodation range 512. Similarly, the coconut 502 is positioned within the accommodation range 512 but is not perceived to be in focus as the current pose of the eye at the second time $t_2$ is focused on the tree 504.

In other embodiments, the calculating of a desired focal length in block 406 can optionally include a compensation for existing refractive errors in the user's eye (e.g., myopia, hyperopia). For example, a flat shift may be applied to the desired focal distance for each portion of the integral lightfield to correct for nearsightedness or farsightedness of the user, enabling the image to be viewed in focus by a user who normally must wear corrective lenses (e.g., glasses or contact lenses) without wearing such corrective lenses. Similar compensations can also be applied to account for mechanical/thermal drift due to environmental conditions or assembly tolerances from manufacturing.

With the desired focal length determined, at block 408 the rendering program 144 manipulates the CPU 136 to calculate a voltage to be applied to a variable-index material. As part of this process, the CPU 136 also instructs the calculated voltage to be applied for inducing a change in the refractive index of the variable-index material, which in turn causes a change in the incidence angles of light entering and exiting the lenslets discussed herein. For example, referring back to FIGS. 1 and 2, some embodiment include constructing the lenslets out of the variable-index material. Accordingly, applying the calculated voltage to the lenslets directly changes their refractive indexes and incidence angles of light entering and exiting the lenslet array. In other embodiments, such as discussed relative to FIG. 3, the variable-index material can be provided as a layer disposed between the display panel 118 and the lenslet array 124. In such embodiments, applying the calculated voltage to the layer of variable-index material 158 only directly changes the refractive index and incidence angles of light entering and exiting the layer of variable-index material 158. However, the change to incidence angles of light entering and exiting the layer of variable-index material 158 results in a change to the incidence angles of light received by the lenslet array 124, thereby changing the focus point and length of the lenslets 126. The GPU subsequently renders the lightfield frame at block 210 and provides the lightfield frame to the corresponding one of the computational displays 110, 112 for display to the eye 132 of the user with the adjustment to focal lengths of blocks 406 and 408. It should also be noted that although block 410 is illustrated in FIG. 4 as being the last step of method 400, the process of block 410 may also be performed before, during, or after the process of block 402.

As explained above, the dynamic accommodation range adjustment and focal length change process described herein utilizes an eye tracking component (e.g., eye tracking components 106, 108) to determine the current pose of a corresponding eye. This eye tracking component typically includes one or more IR illuminators to illuminate the eye, an imaging camera to capture imagery of IR reflections from the eye, one or more lenses, waveguides, or other optical elements to guide the reflected IR light from the eye to the imaging camera, and one or more processors executing a software program to analyze the captured imagery.

Figure 5:
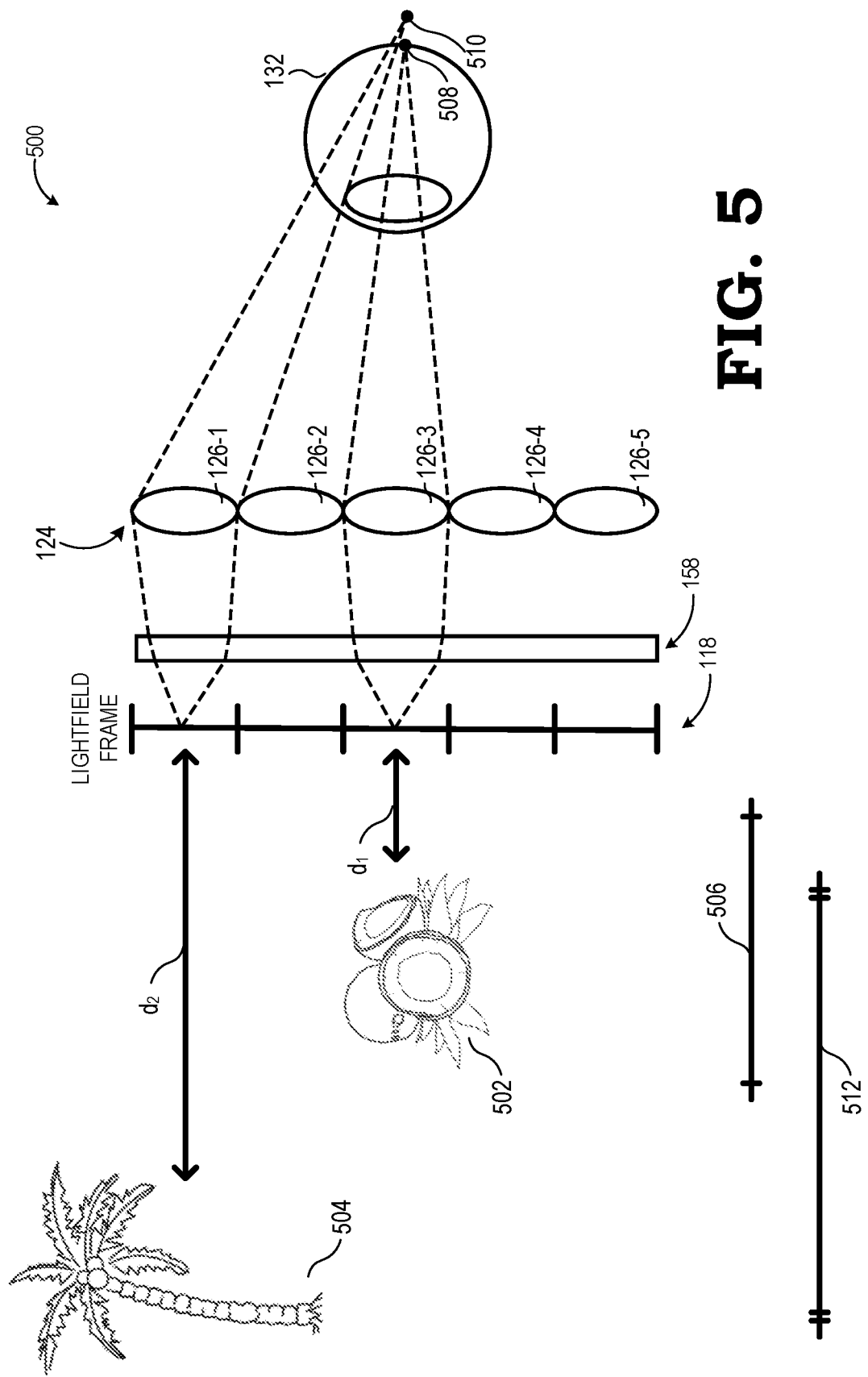
FIG. 5 is a diagram illustrating an example of dynamic accommodation range adjustment in the near-eye display system of FIG. 1 in accordance with some embodiments.

FIG. 5 illustrates an additional example computational display such as the ones utilized in the near-eye display system 100 for accommodation range extension using variable-index materials in accordance with some embodiments. As shown by the cross-section view 500, in this configuration, each of the lenslets 126 of the lenslet array 124 serves as a separate "projector" onto the eye 132, with each "projector" overlapping with one or more adjacent projectors in forming a composite virtual image from the array of elemental images displayed at the display panel 118.

As shown by view 500, a virtual image can include a number of objects intended to be perceived by the eye 132 at different depths. For example, the virtual image includes image data representing a coconut 502 and a tree 504 positioned at depths $d_1$ and $d_2$ within the virtual image, respectively. Assuming in this example that a current pose of the eye 132 determines that the user's gaze is focusing on the coconut 502 at a first time $t_1$, the refractive index of the layer of variable-index material 158 may be computed (e.g., by rendering component 104) and electrically changed such that light containing image data as projected from the lenslets is associated with an accommodation range 506.

Image data for the coconut 502 projected from lenslet 126-3 is focused at a first focal point 508 at the back of the eye 132. Accordingly, the coconut 502 in the virtual image would appear to be in focus at the first time $t_1$. However, based on the refractive index of the layer of variable-index material 158 at the first time $t_1$, light containing image data for the tree 504 from lenslet 126-1 is focused at a second focal point 510. In other words, the tree 504 is positioned outside of the accommodation range 506. Accordingly, the tree 504 in the virtual image would appear to be out of focus (e.g., blurry) at the first time $t_1$. In contrast, if the refractive index of the layer of variable-index material 158 had been computed to generate an accommodation range 512, both the coconut 502 and tree 504 would appear to be in focus to the eye 132.

Figure 6:
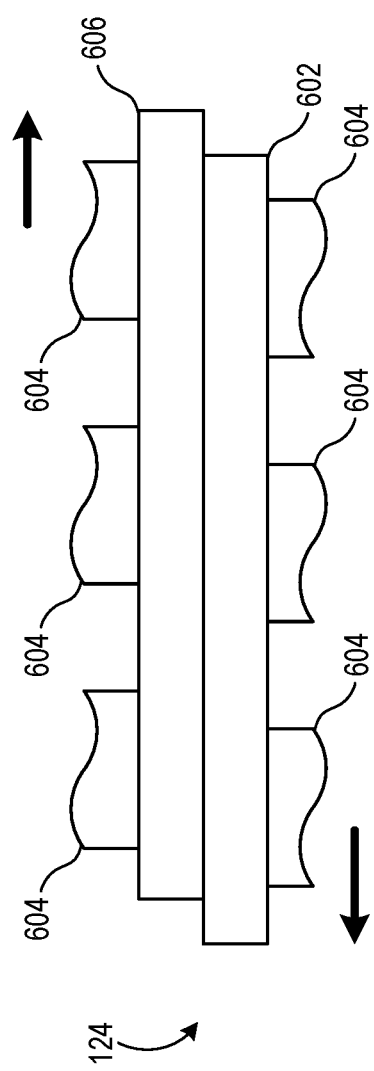
FIG. 6 is a diagram illustrating an example varifocal lenslet array for dynamic focal length adjustment in the near-eye display system of FIG. 1 in accordance with some embodiments.

FIG. 6 is a diagram illustrating an example varifocal lenslet array for dynamic focal length adjustment in the near-eye display system of FIG. 1 in accordance with some embodiments. As shown by the top view 600, in this configuration, the lenslet array 124 includes a first array 602 of cubic phase plates 604 and a second array 606 of cubic phase plates 604. Spatially translating the first array of cubic phase plates 602 relative to the second array of cubic phase plates 604, such as by the lateral displacement between the two arrays as illustrated in FIG. 6, changes the focal length of the cubic phase plates 604. By translating two superimposed cubic phase functions, a variable quadratic (i.e., varifocal) effect is introduced. Similarly, the lenslet array 124 can include two arrays of freeform phase plates, such as Lohmann-Alvarez varifocal lenses in which the focal length of the lenses is changed by a lateral displacement between the lenses. This enables dynamic focal length adjustment by using well defined surface functions. In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a near-eye display system, a method comprising:
   determining, using an eye tracking component of the near-eye display system, a first pose of a user's eye;
   determining a desired focal point for an array of elemental images forming an integral lightfield frame based on the first pose of the user's eye by identifying a virtual depth of a target object focused on by the first pose of the user's eye relative to the virtual depths of one or more other objects within the integral lightfield frame;
   changing the focal length of light projecting out of a lenslet array based on the first pose of the user's eye and the desired focal point;
   rendering the array of elemental images at a position within the integral lightfield frame based on the changed focal length of light; and
   displaying the integral lightfield frame at a display panel of the near-eye display system.

2. The method of claim 1, wherein determining the first pose of the user's eye comprises:
   capturing imagery of the user's eye using an imaging camera disposed between the display panel and the lenslet array overlying the display panel.

3. The method of claim 1, wherein changing the focal length comprises:
   applying a voltage to a variable-index material disposed between the display panel and the lenslet array to induce a change in a refractive index of the variable-index material, wherein the change in the refractive index causes a change in the incidence angles of light entering and exiting the lenslet array.

4. The method of claim 1, wherein changing the focal length comprises:
   applying a voltage to one or more lenslets in the lenslet array comprising a variable-index material to induce a change in a refractive index of the one or more lenslets, wherein the change in the refractive index causes a change in the incidence angles of light entering and exiting the lenslet array.

5. The method of claim 1, wherein changing the focal length comprises:
   applying a voltage to a variable-index material associated with a first portion of the lenslet array to induce a change in a refractive index of the variable-index material, wherein the first portion of the lenslet array is independently addressable relative to a second portion of the lenslet array, and further wherein the change in the refractive index causes a change in the incidence angles of light entering and exiting the first portion without changing the incidence angles of light entering and exiting the second portion of the lenslet array.

6. The method of claim 1, wherein determining the desired focal point for the array of elemental images further comprises:
   determining the desired focal point to compensate for existing refractive errors in the user's eye.

* * * * *